United States Patent
Liu et al.

(10) Patent No.: US 8,436,835 B2
(45) Date of Patent: May 7, 2013

(54) TOUCH DEVICE, DISPLAY SUBSTRATE, LIQUID CRYSTAL DISPLAY AND OPERATION METHOD FOR PHOTO SENSOR

(75) Inventors: Tzu-Wei Liu, Hsin-Chu (TW); Hsueh-Ying Huang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 350 days.

(21) Appl. No.: 12/684,907

(22) Filed: Jan. 9, 2010

(65) Prior Publication Data
US 2011/0169772 A1 Jul. 14, 2011

(30) Foreign Application Priority Data

Aug. 25, 2009 (TW) ................................ 98128544 A

(51) Int. Cl.
*G09G 3/36* (2006.01)

(52) U.S. Cl.
USPC ........................... 345/175; 345/104; 345/173

(58) Field of Classification Search ........... 345/173–175
See application file for complete search history.

(56) References Cited

U.S. PATENT DOCUMENTS

| | | | |
|---|---|---|---|
| 6,455,839 B1 | 9/2002 | O'Connor et al. | |
| 6,995,743 B2* | 2/2006 | Boer et al. | 345/104 |
| 7,279,730 B2* | 10/2007 | Pak et al. | 257/291 |
| 7,532,182 B2* | 5/2009 | Tseng et al. | 345/82 |
| 7,649,527 B2* | 1/2010 | Cho et al. | 345/182 |
| 7,961,171 B2* | 6/2011 | Miyasaka et al. | 345/104 |
| 8,125,580 B2* | 2/2012 | Takama et al. | 349/12 |
| 2008/0100566 A1 | 5/2008 | Miyasaka et al. | |
| 2008/0157893 A1* | 7/2008 | Krah | 331/177 R |
| 2008/0198143 A1* | 8/2008 | Kinoshita et al. | 345/175 |
| 2008/0259051 A1* | 10/2008 | Ota | 345/175 |
| 2009/0147191 A1* | 6/2009 | Nakajima et al. | 349/116 |
| 2010/0033450 A1* | 2/2010 | Koyama et al. | 345/175 |
| 2010/0097352 A1* | 4/2010 | Ahn et al. | 345/175 |

FOREIGN PATENT DOCUMENTS

CN 1624535 A 6/2005

OTHER PUBLICATIONS

Taiwanese Patent Office issued Office Action Mar. 4, 2013.

* cited by examiner

*Primary Examiner* — Christopher E Leiby
(74) *Attorney, Agent, or Firm* — WPAT, PC; Justin King

(57) ABSTRACT

A touch device is disposed on a substrate having a plurality of gate lines. The touch device comprises a power line, a photo sensor and a readout line. The photo sensor is electrically coupled to the power line and two specific gate lines of the gate lines, and generated a different output signal according to irradiation with a different level. The readout line is electrically coupled to the photo sensor for outputting the output signal. The photo sensor comprises a readout switch and a photosensitive switch. The readout switch is electrically coupled to one of the two specific gate lines. The photosensitive switch is electrically coupled to another of the two specific gate lines and the power line. Signals in another of the two specific gate lines and the power line cooperate to determine whether the photosensitive switch is in an off state.

15 Claims, 5 Drawing Sheets

TOUCH DEVICE, DISPLAY SUBSTRATE, LIQUID CRYSTAL DISPLAY AND OPERATION METHOD FOR PHOTO SENSOR

CROSS-REFERENCE TO RELATED APPLICATIONS

This application is based upon and claims the benefit of priority from the prior Taiwanese Patent Application No. 098128544, filed Aug. 25, 2009, the entire contents of which are incorporated herein by reference.

BACKGROUND

1. Field of the Invention

The present invention relates to the touch detecting field, and more particularly to a display substrate, a flat display with touch function, a touch device and a corresponding operation method for a photo sensor.

2. Description of the Related Art

With the rapid development of the technology, since flat display (such as, liquid crystal display) has many advantages, such as high image quality, little size, light weight and wide application-range, etc., it is widely applied into various consumable electronic products, such as mobile phone, notebook computer, desktop display and television, etc., and has been gradually substitute conventional cathode ray tube (CRT) display to be a main trend of the display.

Touch device is configured for providing a new human-machine interface, and it is more intuitional in use and more suitable for the human nature. If the touch device is integrated with the flat display together, the flat display can have a touch function, and it is a development trend of the flat display. The conventional flat display with the touch function generally employs photo sensors to detect whether having a touch object (such as, finger or touch pen) to touch the touch device and the corresponding location thereof. The flat display needs various signal-transmitting lines electrically coupled to the photo sensors for transmitting various signals to the photo sensors, such that the photo sensors can operate normally. Therefore, the signal-transmitting lines occupy a large space, thus the aperture ratio of the flat display is reduced, the luminance of the flat display is decreased, and the power consumption thereof is increased.

BRIEF SUMMARY

The present invention relates to a display substrate with touch function, which has few signal-transmitting lines and can reduce power consumption thereof.

The present invention also relates to a flat display with touch function, which can efficiently reduce an amount of signal-transmitting lines, and efficiently improve an aperture ratio thereof.

The present invention further relates to a touch device, which has few signal-transmitting lines and can reduce power consumption thereof.

The present invention further relates to an operation method for a photo sensor in a pixel, which can employ few signal-transmitting lines to provide various driving signals for controlling the photo sensor.

A display substrate with touch function in accordance with an exemplary embodiment of the present invention comprises a plurality of gate lines and at least one touch device. The gate lines and the touch device are both disposed on a substrate. The touch device comprises at least one readout line, at least one power line, a photo sensor and a readout driving unit. The power line and the readout line are both disposed on the substrate, and the readout line is intersected with the gate lines. The photo sensor is disposed adjacent to a location where a specific gate line of the gate lines and a specific readout line intersect, and the photo sensor comprises a readout switch and a photosensitive switch. The readout switch comprises a first route terminal, a second route terminal and a first control terminal. The second route terminal is electrically coupled to the specific readout line, and the first control terminal is electrically coupled to the specific gate line to determine whether the first route terminal is electrically communicated with the second route terminal. The photosensitive switch comprises a third route terminal, a fourth route terminal and a second control terminal. The fourth route terminal is electrically coupled to the first route terminal of the readout switch, and the second control terminal is electrically coupled to one of the at least one power line to determine whether the third route terminal is electrically communicated with the fourth route terminal. When the photosensitive switch cuts an electrically-communicating path between the third route terminal and the fourth route terminal at the second control terminal, a leakage current with different level is generated between the third route terminal and the fourth route terminal since the irradiation with different level. The readout driving unit is electrically coupled to the specific readout line to read out the leakage current of the photosensitive switch. The third route terminal of the photosensitive switch is electrically coupled to a predetermined gate line of the gate lines except the specific gate line.

A flat display with touch function in accordance with another exemplary embodiment of the present invention comprises a substrate, a plurality of gate lines, a plurality of data lines, a plurality of readout lines, a plurality of power lines, a plurality of pixel transistors, a plurality of pixel electrodes, a photo sensor and a readout driving unit. The gate lines, the data lines, the readout lines and the power lines are all disposed on the substrate, and the gate lines and the data lines are intersected with each other to divide the flat display into a plurality of pixel regions. The pixel transistors are disposed in the pixel regions respectively, and each of the pixel transistors is electrically coupled to a corresponding gate line and a corresponding data line. The pixel electrodes are disposed in the pixel regions respectively, and each of the pixel electrodes is electrically coupled to a corresponding pixel transistors. The photo sensor is disposed in one of the pixel regions, and comprises a readout switch and a photosensitive switch. The readout switch comprises a first route terminal, a second route terminal and a first control terminal. The second route terminal is electrically coupled to a specific readout line of the readout lines, and a first control terminal is electrically coupled to a specific gate line of the gate lines to determine whether the first route terminal is electrically communicated with the second route terminal. The photosensitive switch comprises a third route terminal, a fourth route terminal and a second control terminal. The fourth route terminal is electrically coupled to the first route terminal of the readout switch, and the second control terminal is electrically coupled to one of the power lines to determine whether the third route terminal is electrically communicated with the fourth route terminal. The photosensitive switch cuts an electrically-communicating path between the third route terminal and the fourth route terminal at the second control terminal, and a leakage current with different level is generated between the third route terminal and the fourth route terminal since the irradiation with different level. The readout driving unit is electrically coupled to the specific readout line to read out the leakage current generated from the photosensitive switch.

The third route terminal of the photosensitive switch is electrically coupled to a predetermined gate line of the gate lines except the specific gate line.

In an exemplary embodiment of the present invention, the predetermined gate line is a next gate line adjacent to the specific gate line.

In an exemplary embodiment of the present invention, the predetermined gate line is a previous gate line adjacent to the specific gate line.

In an exemplary embodiment of the present invention, the photo sensor further comprises a first capacitor and a second capacitor. The first capacitor is electrically coupled between the third route terminal and the fourth route terminal of the photosensitive switch, and the second capacitor is electrically coupled between the second control terminal and the fourth route terminal of the photosensitive switch.

In an exemplary embodiment of the present invention, the readout driving unit comprises a charge amplifier, a capacitor and a switch element. A first input terminal of the charge amplifier is electrically coupled to the specific readout line, a second input terminal thereof is electrically coupled to a reference power supply, and an output terminal thereof is configured for obtaining an output voltage according to signals in the first input terminal and the second input terminal. The capacitor is electrically coupled between the first input terminal and the output terminal of the charge amplifier, and the switch element is electrically coupled between the first input terminal and the output terminal of the charge amplifier.

A touch device in accordance with other exemplary embodiment of the present invention is disposed on a substrate having a plurality of gate lines. The touch device comprises a power line, a photo sensor and a readout line. The photo sensor is electrically coupled to two specific gate lines of the gate lines, and generates a different output signal by luminance with a different level. The readout line is electrically coupled to the photo sensor for outputting the output signal. The photo sensor comprises a readout switch and a photosensitive switch. The readout switch is electrically coupled to one of the two specific gate lines for determining whether is turned on according to the transmitted signal. The photosensitive switch is coupled to another of the two specific gate lines and the power line to generate a leakage current with a different level by the luminance with a different level. Signals in another of the two specific gate line and the power line are cooperated to determine whether the photosensitive switch is operated in an off state.

An operation method for a photo sensor in a pixel in accordance with other exemplary embodiment of the present invention is adapted into the photo sensor disposed on a flat panel. The flat panel comprises a plurality of gate lines arranged in parallel, and each of the gate lines is configured for determining whether at least one pixel switch is turned on. The photo sensor comprises a photosensitive switch, and the photosensitive switch is configured for generating a leakage current with a different level according to the irradiation with a different level when it is in an off state. The method comprises: making the photosensitive switch be electrically coupled to a power line and a specific gate line of the gate lines; and adjusting a voltage difference between the specific gate line and the power line to keep the photosensitive switch operating in the off state.

the touch device and the display crystal display of the present invention employs the original gate lines thereof to provide the voltages of the readout switch and the photosensitive switch of the photo sensor, specifically, employs one of the gate lines to provide the voltage to the source electrode of the photosensitive switch. Thus the liquid crystal display with the touch function does not need to dispose many signal-transmitting lines to transmit the various signals to the photo sensor for performing the touch function. Therefore, the present invention can save the area for disposing the signal-transmitting lines, increase the aperture ratio of the liquid crystal display, improve the luminance of the liquid crystal display, and decrease the related power consumption.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present touch device, the present display substrate, the present liquid crystal display and the present operation method for photo sensor, in detail. The following description is given by way of example, and not limitation.

Figure 1:
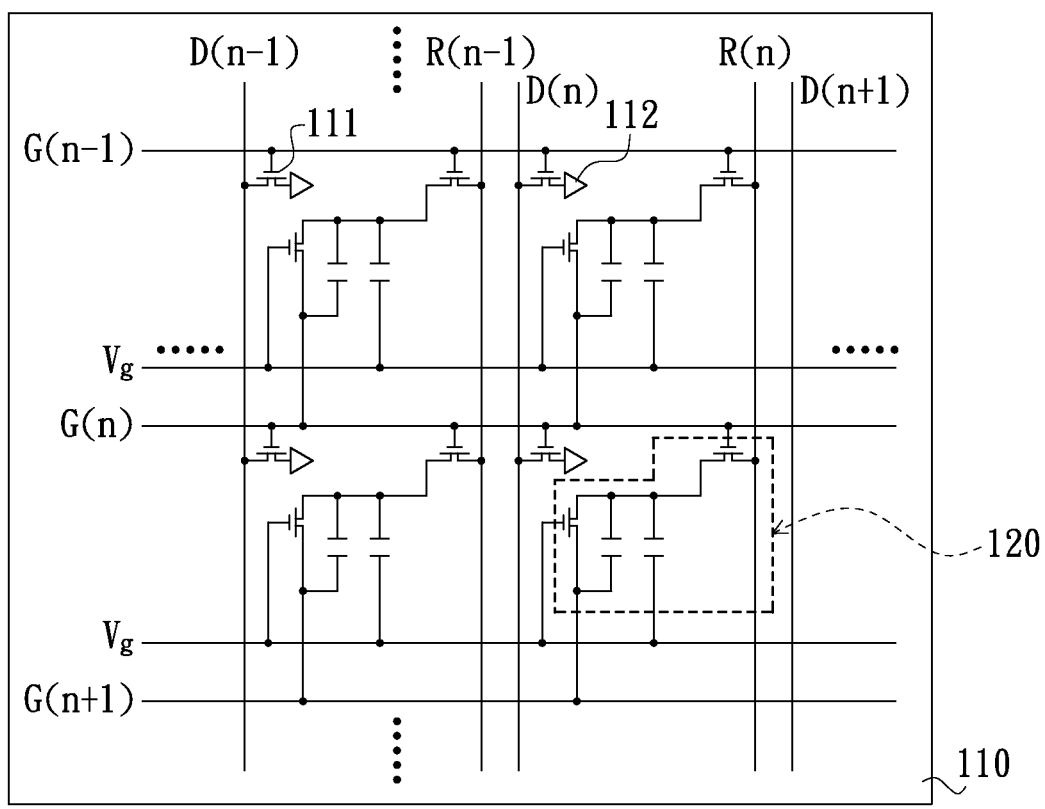
FIG. 1 is an equivalent circuit schematic view of a flat display with touch function in accordance with an exemplary embodiment of the present invention.

Refer to FIG. 1, which is an equivalent circuit schematic view of a flat display with touch function in accordance with an exemplary embodiment of the present invention. In this exemplary embodiment, the flat display 100 may be a liquid crystal display, which includes a substrate 110, another substrate (not shown) opposite to the substrate 110 and a liquid crystal layer (not shown) between the two substrates. The flat display 100 includes a plurality of gate lines, such as G(n−1), G(n) and G(n+1), and a plurality of data lines, such as D(n−1), D(n) and D(n+1), which are disposed on the substrate 110. The gate lines and the data lines are intersected with each other to divide the flat display 100 into a plurality of pixel regions. For example, the gate lines G(n−1), G(n) and G(n+1) and the data lines D(n−1), D(n) and D(n+1) are intersected with each other to form 4 pixel regions. Each pixel region of the flat display 100 has a pixel transistor 111 and a pixel electrode 112 disposed therein, wherein the pixel transistor 111 is electrically coupled to the corresponding gate line and the corresponding data line respectively, and the pixel electrode 112 is electrically coupled to the corresponding pixel transistor 111. The flat display 100 employs the corresponding gate line to transmit a gate signal to the pixel transistor 111 to control on/off state of the pixel transistor 111. When the pixel transistor 111 is in the on state, a data signal is transmitted to the corresponding the pixel electrode 112 via the pixel transistor 111 by the corresponding data line. Thus the flat display 100 displays a corresponding image. The above technology is obvious for persons skilled in the art, and is not described herein.

Figure 2:
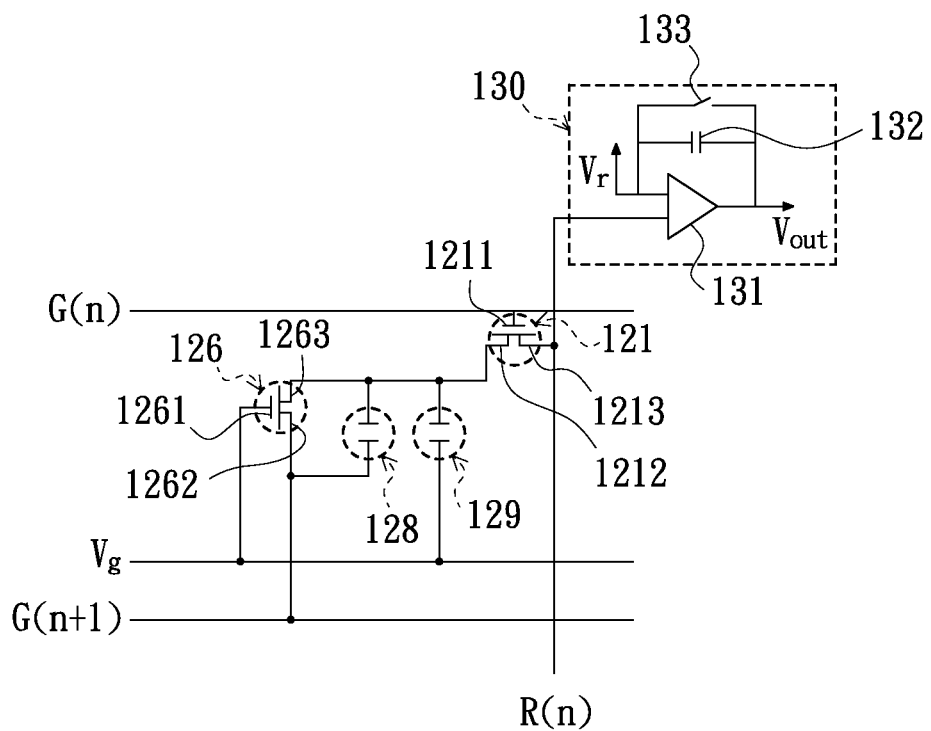
FIG. 2 is an equivalent circuit schematic view of a photo sensor and a readout driving unit thereof in accordance with an exemplary embodiment of the present invention.

For making the flat display 100 have the touch function, the flat display 100 further includes photo sensors 120, power lines Vg and readout lines R(n−1), R(n), which are configured for compose a touch device and are disposed on the substrate 110. In this exemplary embodiment, each pixel region has a photo sensor 120 disposed therein, and the readout lines R(n−1), R(n) are intersected with the gate lines G(n−1), G(n) and G(n+1) respectively. However, the present invention is not limited in this embodiment. The persons skilled in the art also can dispose the photo sensors 120 in some specific pixel regions of the plurality of adjacent pixel regions according to actual needs. Refer to FIG. 2 together, which is an equivalent circuit schematic view of the photo sensor and a readout driving unit in a pixel region as shown in FIG. 1. The photo sensor 120 includes a readout switch 121 and a photosensitive switch 126. Preferably, the readout switch 121 is a thin-film transistor (TFT), such as a metal-oxide semiconductor field-effect transistor (MOSFET) or other transistor. The present invention employs the MOSFET to describe the present invention, however, the present invention is not limited in this embodiment.

A gate electrode 1211 (or called a first control terminal) of the readout switch 121 is electrically coupled to a gate line G(n) to control on/off state of the readout switch 121, a drain electrode 1213 (or called a second route terminal) thereof is electrically coupled to a readout line R(n) and a source electrode 1212 (or called a first route terminal) thereof is electrically coupled to a drain electrode 1263 (or called a fourth route terminal) of the photosensitive switch 126. A gate electrode 1261 (or called a second control terminal) of the photosensitive switch 126 is electrically coupled to the power line Vg to control on/off state of the photosensitive switch 126, and a source electrode 1262 (or called a third route terminal) thereof is electrically coupled to another gate line, such as a next gate line G(n+1) adjacent to the gate line G(n). The readout line R(n) is electrically coupled to a readout driving unit 130. When the photosensitive switch 126 is in the off state, leakage currents with different levels are generated between the drain electrode 1263 and the source electrode 1262 thereof because the irradiation with different levels irradiate the photosensitive switch 126.

Furthermore, the photo sensor 120 may further include a first capacitor 128 and a second capacitor 129. The first capacitor 128 is electrically coupled between the drain electrode 1263 and the source electrode 1262 of the photosensitive switch 126. The second capacitor 129 is electrically coupled between the drain electrode 1263 and the gate electrode 1261 of the photosensitive switch 126. The first capacitor 128 and the second capacitor 129 perform charging/discharging operation by the leakage current generated by the photosensitive switch 126. The readout driving unit 130 may includes a charge amplifier 131, a capacitor 132 and a switch element 133. A first input terminal of the charge amplifier 131 is electrically coupled to the readout line R(n), a second input terminal thereof is electrically coupled to a reference power supply Vr, and an output terminal thereof obtains an output voltage Vout according to the signals in the first input terminal and the second input terminal. The capacitor 132 is electrically coupled between the first input terminal and the output terminal of the charge amplifier 131, and the switch element 133 is electrically coupled to the capacitor 132 in parallel, that is the switch element 133 is electrically coupled between the first input terminal and the output terminal of the charge amplifier 131.

The flat display 100 with the touch function disclosed in the exemplary embodiment of the present invention employs the gate line G(n+1) and the power line Vg to supply voltages to the gate electrode 1261 and the source electrode 1262 of the photosensitive switch 126, such that a voltage difference Vgs therebetween is always lower than a threshold voltage of the photosensitive switch 126. Thus the photosensitive switch 126 is kept in the off state and does not influence the leakage current generated by the photosensitive switch 126. When the readout switch 121 is turned on, that is, the readout switch 121 is in the on state, a signal is transmitted to the readout line Rn at this moment. In this exemplary embodiment, the signal is preferably a result of charging/discharging the capacitor 128, 129 by the leakage current generated by the photosensitive switch 126. The signal is transmitted to the readout line Rn via the readout switch 121 in the on state, and is read by the readout driving unit 130. The readout driving unit 130 can determine whether the photosensitive switch 126 is shaded by an object (such as a finger or a touch pen) according to the read result (or called the signal), thus can determine whether the pixel region where the photo sensor 120 is located, is touched. The technology of how the readout driving unit 130 judges the read signal, is obvious for the persons skilled in the art, and it is not limited herein.

From the above description, the touch device mainly composed by the photo sensors 120 in accordance with the present invention is disposed in the substrate 110 having the plurality of gate lines. The touch device employs the original gate lines G(n) and G(n+1) of the flat display 100 to provides various driving signals to the photosensitive sensor 120, such that the touch device is integrated with the flat display and the flat device 100 has the touch function. In addition, it should be noted that the touch device mainly composed by the photo sensors 120 also can be applied into other-type flat display, such as organic light-emitting device (OLED), flexible display, etc., except the liquid crystal display described in the present invention. If the flat display has a plurality of gate lines, it can employ the photo sensors of the present invention such that the touch device is integrated with the flat device.

In addition, although each pixel region of the flat display 100 with the touch function disclosed in the exemplary embodiment of the present invention as shown in FIG. 1 has a photo sensor correspondingly, it is obvious for the persons skilled in the art that a photo sensor can correspond to a plurality of pixel regions. For example, only a photo sensor may be disposed in 4 pixel regions formed by intersecting the gate lines G(n−1), G(n), G(n+1) and the data lines D(n−1), D(n), D(n+1).

Figure 3:
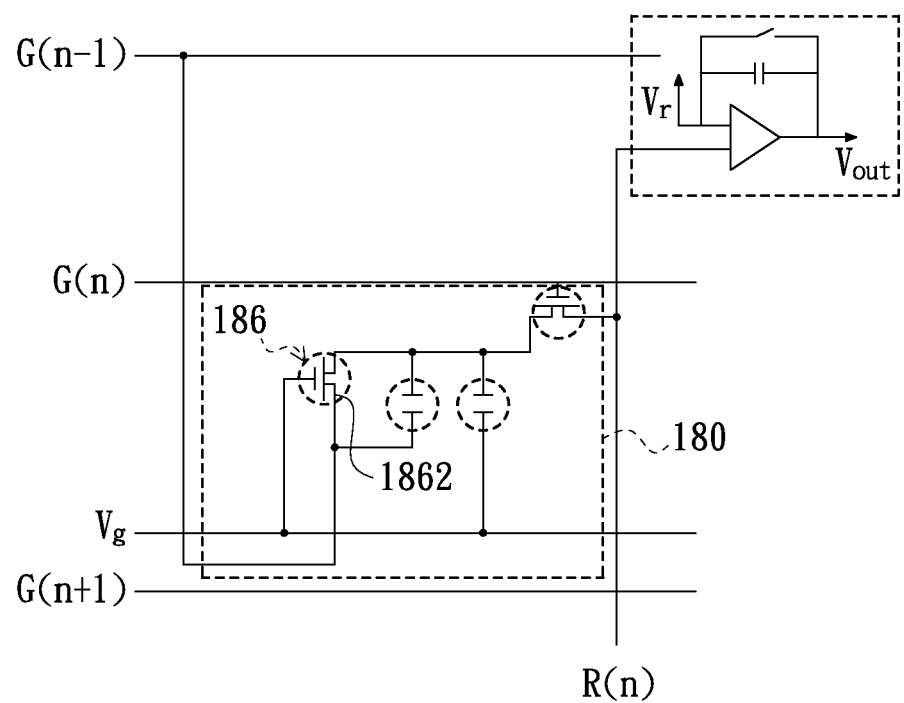
FIG. 3 is an equivalent circuit schematic view of a photo sensor and a readout driving unit thereof in accordance with another exemplary embodiment of the present invention.

Refer to FIG. 3, which is an equivalent circuit schematic view of a photo sensor and a readout driving unit in accordance with another exemplary embodiment of the present invention. The photo sensor 180 of the exemplary embodiment is similar with the photo sensor 120 as shown in FIG. 2, except that a source electrode 1862 of a photosensitive switch 186 of the photo sensor 180 of the exemplary embodiment is electrically coupled to a previous gate line G(n−1) adjacent to the gate line G(n), such that a source voltage is provided to the source electrode 1862 of the photosensitive switch 186 via the gate line G(n−1).

Figure 4:
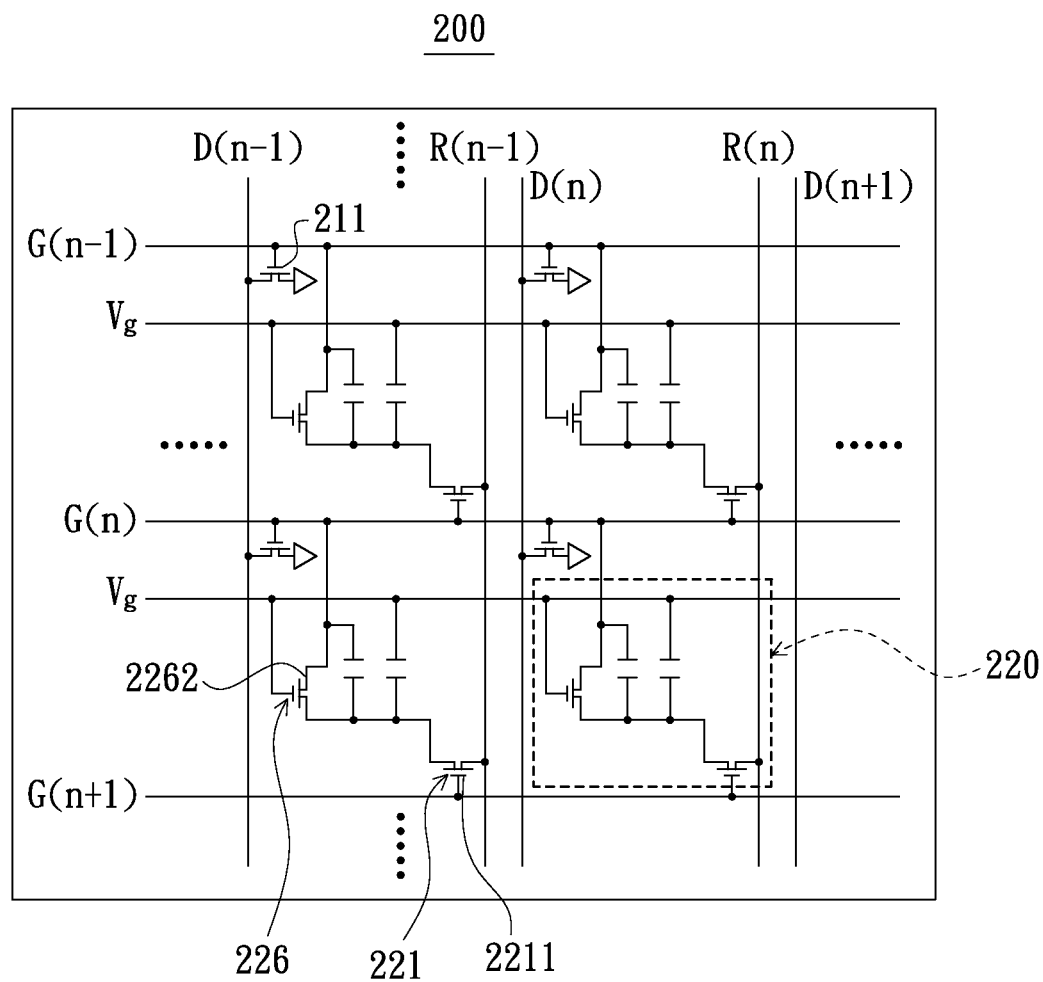
FIG. 4 is an equivalent circuit schematic view of a flat display with touch function in accordance with another exemplary embodiment of the present invention.

Refer to FIG. 4, which is an equivalent circuit schematic view of a flat display with touch function in accordance with other exemplary embodiment of the present invention. The flat display 200 is similar with the flat display 100 as shown in FIG. 1, except that a gate electrode 2211 of a readout switch 221 of a photo sensor 220 in each pixel region of the flat display 200 is electrically coupled to another gate line in the corresponding pixel region, which is adjacent to the gate line electrically coupled to the pixel transistor 211 in the corresponding pixel region. For example, for the pixel region corresponding to the gate line Gn and the data line Dn, the pixel transistor 211 therein is electrically coupled to the gate line Gn, the gate electrode 2211 of the readout switch 221 of the photo sensor 220 therein is electrically coupled to a next gate line G(n+1) adjacent to the gate line Gn, and the source electrode 2262 of the photosensitive switch 226 is electrically coupled to the gate line Gn.

Figure 5:
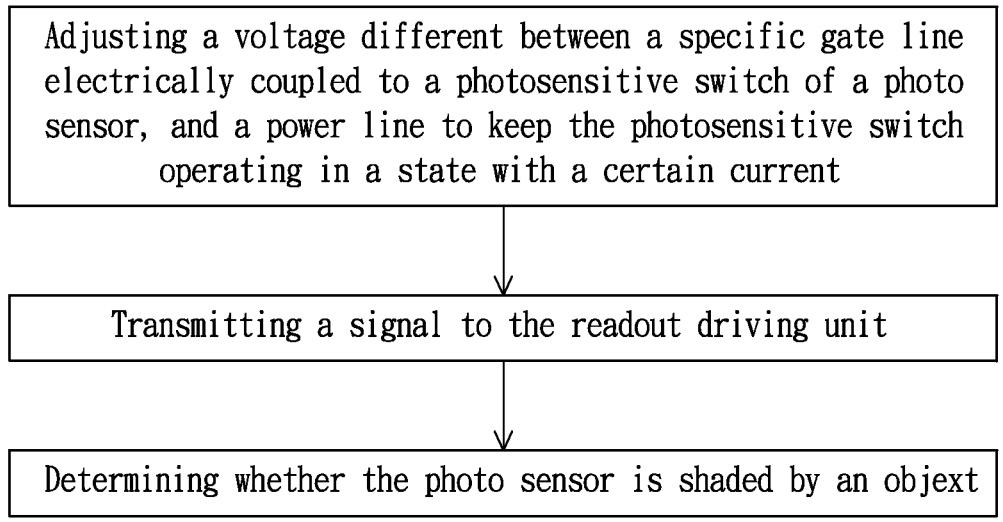
FIG. 5 is a flow chart of an operation method for a photo sensor in a pixel in accordance with an exemplary embodiment of the present invention.

In addition, the present invention also provides an operation method for a photo sensor in a pixel region, which is configured for driving the flat display as shown in FIG. 1 or 4. Refer to FIG. 5, which is a flow chart of the operation method. The operation method includes: adjusting a voltage difference between a specific gate line and a power line electrically coupled to a photosensitive switch to keep the photosensitive switch operating in a state with a certain current while the photosensitive switch is shaded; transmitting a signal to a readout signal unit; and determining whether the photo sensor is shaded by an object according to the signal received by the readout signal unit.

The voltage difference between the specific gate line and the power line is adjusted such that the voltage difference is lower than a threshold voltage of the photo sensor. In addition, the step of transmitting the signal to the readout driving unit includes turning on a readout switch of the photo sensor. The step thereof further includes transmitting a result of charging/discharging a capacitor by the photosensitive switch to a readout line. The step of determining whether the photo sensor is shaded by the object is determined by the result of charging/discharging the capacitor by the photosensitive switch.

The present invention makes the photosensitive switch be electrically coupled to the power line and one gate line of the flat display, and adjusts the voltage difference between the gate line and the power line to keep the photosensitive switch operating in the off state. Thus some circuit element may be omitted, and the manufacturing cost and the aperture ratio thereof may be improved.

In summary, the flat display with the touch function of the present invention employs the leakage current generated by the photosensitive switch of the photo sensor to determine whether the photo sensor is touched by the touch object, such that the liquid crystal display has the touch function. Furthermore, the flat display of the present invention employs the original gate lines as the gate lines, and employs the two adjacent gate lines to provide the voltages of the readout switch and the photosensitive switch of the photo sensor, specifically, employs the gate line to provide the voltage of the source electrode of the photosensitive switch. Thus the flat display with the touch function can not only perform the touch function, but also need not to dispose many signal-transmitting lines to transmit the various signals to the photo sensor. Therefore, the present invention can save the area for disposing the signal-transmitting lines, increase the aperture ratio of the flat display, improve the luminance of the flat display, and decrease the related power consumption.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A substrate with touch function, comprising:
a plurality of gate lines disposed on the substrate;
at least one touch device disposed on the substrate, the touch device comprising:
  a power line disposed on the substrate;
  at least one readout line disposed on the substrate and correspondingly intersecting with the gate lines;
  a photo sensor disposed adjacent to a location where a specific gate line of the gate lines and a specific readout line of the at least one readout line intersect, the photo sensor comprising:
    a readout switch, comprising:
      a first route terminal;
      a second route terminal electrically coupled to the specific readout line; and
      a first control terminal electrically coupled to the specific gate line; and
    a photosensitive switch, comprising:
      a third route terminal;
      a fourth route terminal electrically coupled to the first route terminal; and
      a second control terminal electrically coupled to the power line; and
  a readout driving unit electrically coupled to the specific readout line;
  wherein, the third route terminal of the photosensitive switch is electrically coupled to a predetermined gate line of the gate lines except the specific gate line such that the first control terminal of the readout switch and the third route terminal of the photosensitive switch are electrically coupled with two different gate lines respectively, and the predetermined gate line and the power line supply voltages to the third route terminal and the second control terminal of the photosensitive switch, such that a voltage difference between the third route terminal and the second control terminal of the photosensitive switch is always lower than a threshold voltage of the photosensitive switch.

2. The substrate as claimed in claim 1, wherein the predetermined gate line is a next gate line adjacent and next to the specific gate line.

3. The substrate as claimed in claim 1, wherein the predetermined gate line is a previous gate line adjacent and prior to the specific gate line.

4. The substrate as claimed in claim 1, wherein the photo sensor further comprises:
a first capacitor electrically coupled between the third route terminal and the fourth route terminal of the photosensitive switch; and
a second capacitor electrically coupled between the second control terminal and the fourth route terminal of the photosensitive switch.

5. The substrate as claimed in claim 1, wherein the readout driving unit comprises:
a charge amplifier, comprises:
  a first input terminal electrically coupled to the specific readout line;
  a second input terminal electrically coupled to a reference power supply; and
  an output terminal configured for obtaining an output voltage according to signals on the first input terminal and the second input terminal;
a capacitor electrically coupled between the first input terminal and the output terminal of the charge amplifier; and a switch element electrically coupled between the first input terminal and the output terminal of the charge amplifier.

6. A liquid crystal display with touch function, comprising:
the substrate as claimed in claim 1;
another substrate opposite to the substrate; and
a liquid crystal layer disposed between the two substrates.

7. The liquid crystal display as claimed in claim 6, further comprising:
- a plurality of data lines disposed on the substrate and intersecting with the gate lines to divide the liquid crystal display into a plurality of pixel regions;
- a plurality of pixel transistors disposed in the pixel regions respectively and electrically coupled to the corresponding gate lines and the corresponding data lines respectively; and
- a plurality of pixel electrodes disposed in the pixel regions respectively, and one of the pixel electrodes being electrically coupled to a corresponding one of the pixel transistors.

8. The liquid crystal display as claimed in claim 6, wherein the predetermined gate line is a previous gate line adjacent and prior to the specific gate line.

9. The liquid crystal display as claimed in claim 8, wherein the specific gate line is the same as the gate line electrically coupled to the pixel transistor in one of the pixel regions where the readout switch is located.

10. The liquid crystal display as claimed in claim 8, wherein the specific gate line being adjacent to the gate line electrically coupled to the pixel transistor in one of the pixel regions where the readout switch is located.

11. An operation method of a photo sensor in a pixel, configured for driving the substrate with touch function as claimed in claim 1, the operation method comprising:
- adjusting a voltage difference between the specific gate line and the power line to keep the photosensitive switch operating in a state with a certain current;
- transmitting a signal to the readout driving unit; and
- determining whether the photo sensor is shaded by an object.

12. The operation method as claimed in claim 11, wherein adjusting the voltage difference between the specific gate line and the power line to keep the photosensitive switch operating in the state with the certain current, employs the specific gate line and the power line to provide a voltage lower than a threshold voltage of the photo sensor.

13. The operation method as claimed in claim 11, wherein transmitting the signal to the readout driving unit, comprises turning on the readout switch.

14. The operation method as claimed in claim 13, wherein transmitting the signal to the readout driving unit, further comprises transmitting a result of charging/discharging a capacitor by the photosensitive switch to the readout line.

15. The operation method as claimed in claim 14, wherein determining whether the photo sensor is shaded by the object, is determined by the result of charging/discharging the capacitor by the photosensitive switch.

* * * * *